United States Patent
Horne et al.

(10) Patent No.: US 10,015,316 B1
(45) Date of Patent: Jul. 3, 2018

(54) RESPONSE QUALITY INDEX FOR SERVICE SESSIONS

(71) Applicant: United Services Automobile Association (USAA), San Antonio, TX (US)

(72) Inventors: Renee Lynette Horne, San Antonio, TX (US); Julie Finlay, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/371,405

(22) Filed: Dec. 7, 2016

Related U.S. Application Data

(60) Provisional application No. 62/270,217, filed on Dec. 21, 2015.

(51) Int. Cl.
- *H04M 3/00* (2006.01)
- *H04M 5/00* (2006.01)
- *H04M 3/51* (2006.01)
- *G06F 17/27* (2006.01)

(52) U.S. Cl.
CPC ...... *H04M 3/5175* (2013.01); *G06F 17/2735* (2013.01); *G06F 17/2785* (2013.01); *H04M 3/5191* (2013.01)

(58) Field of Classification Search
CPC .............. H04M 3/5175; H04M 3/5191; G06F 17/2735; G06F 17/2785
USPC .................. 379/265.07, 265.01, 266.01, 309
See application file for complete search history.

(56) References Cited

U.S. PATENT DOCUMENTS

| | | | |
|---|---|---|---|
| 6,868,154 B1 * | 3/2005 | Stuart | H04M 3/51 379/221.01 |
| 9,191,615 B1 * | 11/2015 | Valimaki | H04L 12/1813 |
| 2003/0004777 A1 * | 1/2003 | Phillips | G06Q 10/04 705/7.28 |

* cited by examiner

*Primary Examiner* — Quynh Nguyen
(74) *Attorney, Agent, or Firm* — Fish & Richardson P.C.

(57) ABSTRACT

Techniques are described for analyzing communications sent during a service session to provide (e.g., customer) service on a social media channel, the analysis to determine a quality of service provided during the session. Natural language processing, lexical analysis, pattern matching, or other types of analysis may be used to determine an empathy factor and a conversational factor for communications between a service representative (SR) and a user during a session. The factors may be combined with other factors, such as a timely acknowledgement factor and a timely resolution factor, to generate a response quality index (RQI) for the session. Based on the RQI, feedback information may be generated and sent to the SR. In some implementations, the communications may be analyzed and feedback information sent to the SR in real time during the session, to dynamically improve service quality.

19 Claims, 9 Drawing Sheets

RESPONSE QUALITY INDEX FOR SERVICE SESSIONS

CROSS-REFERENCE TO RELATED APPLICATION

The present disclosure is related to, and claims priority to, U.S. Provisional Patent Application Ser. No. 62/270,217, titled "Response Quality Index for Service Sessions," which was filed on Dec. 21, 2015, the entirety of which is hereby incorporated by reference into the present disclosure.

BACKGROUND

With the growth of online social media, more users are employing social media to interact with service representatives who may answer questions or otherwise provide support. Social media users expect a certain level of promptness in receiving responses to questions or support requests, but social media users also expect responses that use plain language or everyday vernacular, i.e., responses in a "human voice" instead of pre-programmed responses, machine-generated responses, and/or responses that include business-style jargon. Accordingly, servicing users via social media may present unique challenges. In traditional systems, the quality of responses to service requests via social media may be measured subjectively and inconsistently across different platforms and across different service representatives.

SUMMARY

Implementations of the present disclosure are generally directed to analyzing communications sent during a service session between a service representative and a user, to determine a quality of service provided during the session. More specifically, implementations are directed to determining a response quality index that measures the quality of service provided during the session, where the response quality index is based on multiple factors including an empathy factor, a conversational factor, a timely acknowledgement factor, and/or a timely resolution factor.

In general, innovative aspects of the subject matter described in this specification can be embodied in methods that includes actions of: accessing at least one communication from a service representative (SR) to a user during a service session facilitated through a computer-implemented service; determining at least one factor for the service session based at least partly on text data in the at least one communication; based on the at least one factor, generating a response quality index (RQI) that indicates a quality of one or more responses provided by the SR in the service session; based on one or more of the RQI or the at least one factor, determining feedback information; and communicating the feedback information for presentation on a computing device associated with the SR.

Implementations can optionally include one or more of the following features: the at least one factor includes one or more of: an empathy factor; a conversational factor; a timely acknowledgement factor; or a timely resolution factor; determining the at least one factor includes performing a natural language (NL) analysis to determine a SR emotional characteristic of the text data; determining the at least one factor includes determining the empathy factor based on the emotional characteristic; determining the at least one factor includes determining a user emotional characteristic by performing the NL analysis to analyze user text data in at least one communication from the user during the service session; determining the at least one factor includes determining the empathy factor based on a degree of correspondence between the user emotional characteristic and the SR emotional characteristic; determining the at least one factor includes analyzing the text data to identify text elements of the text data; determining the at least one factor includes determining the conversational factor based on a degree of correspondence between the text elements and a previously generated dictionary of terms; determining the timely acknowledgement factor includes determining a time period from the user's service request submission to the SR's acknowledgement of the service request; determining the timely acknowledgement factor includes determining the timely acknowledgement factor based on a comparison of the time period to a service level objective (SLO); determining the timely resolution factor includes determining a time period from the user's service request submission to a resolution of the service request; determining the timely resolution factor includes determining the timely resolution factor based on a comparison of the time period to a service level objective (SLO); determining the at least one factor is performed during the service session; the feedback information is communicated for presentation during the service session; determining the at least one factor is performed after the service session; the feedback information is communicated for presentation after the service session; communicating the feedback information includes causing another SR to be added to the service session; or the RQI is a weighted mathematical combination of the at least one factor.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Implementations provide a fundamental improvement in the operation of computing devices that provide functionality for user service, by determining a response quality index that objectively indicates a quality of service provided by a service representative, and by enabling the dynamic response in real time to measured changes in the service quality as indicated by the response quality index. Implementations also provide for analysis device(s) that are less prone to errors in service quality evaluation compared to traditional analysis device(s) that may evaluate the quality of service sessions using more subjective and/or arbitrary measurement techniques. Because implementations provide systems that may respond more quickly to a detected change in quality, and that may be less prone to errors in quality evaluation, implementations avoid the consumption of processing power, memory, storage space, network bandwidth, and/or other computing resources that may be consumed by traditional systems that may be required to repeat operations to address errors in quality evaluation, and that may respond more slowly to changes in quality or may be unable to identify changes in quality.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
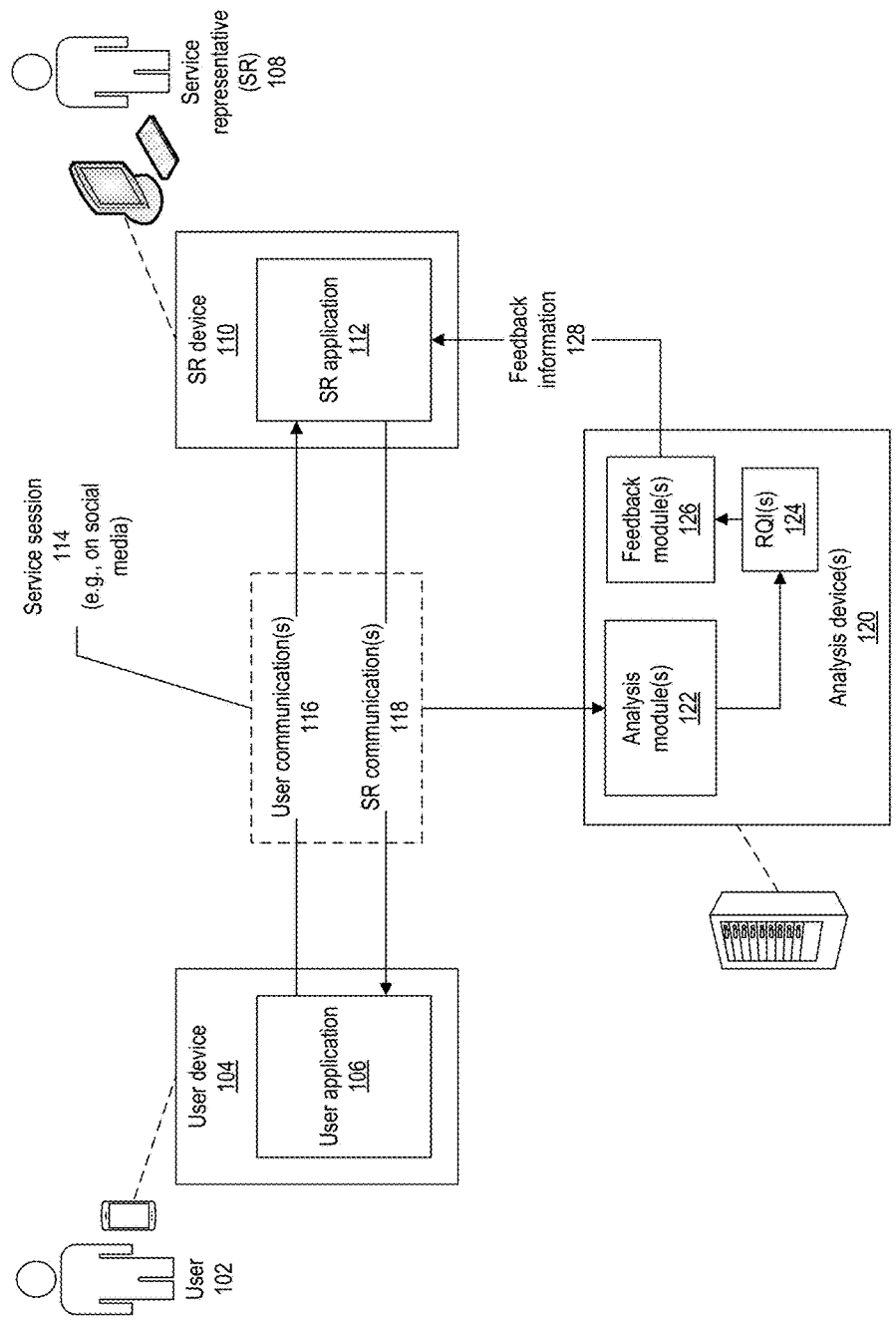
FIG. 1 depicts an example system for determining and using a response quality index to measure the quality of communications in a service session, according to implementations of the present disclosure.

Implementations of the present disclosure are directed to systems, devices, methods, and computer-readable media for the determination and use of a response quality index (RQI) that provides an objective measure of the quality of a response to a service request, such as a service request submitted via social media or other communication channels. The RQI provides an objective measure of the quality of a service response to a user's inquiries via social media or other channels, to enable an organization to determine whether its users' service needs are being met. The RQI also provides a tool through which an organization may ensure that its service representatives (SRs) are appropriately balancing the need for timely responses with the need for human-sounding, and humane, responses to the users' problems expressed via social media or other channels.

A service session between a user (e.g., a customer) and a SR may include any number of communications between the user and the SR. In some examples, a service request is received from a user via a social media channel, such as in a real-time chat session, through an exchange of emails, text messages, or posts, during a telephone call, or otherwise. A SR may respond to the service request via the social media channel, such as in a post, a text response in a chat session, an email, a text message, a voice response in a telephone call, or otherwise. The user may submit any number of follow-up questions, and the SR may respond in turn. Accordingly, a service session may constitute a conversation between the user and the SR that includes any number of communications over any period of time, with any amount of time passing between the various communications. In examples where the service session is via social media, the conversation may be conducted in public in a manner that is viewable by any number of other users who may comment on the various communications between the user and the SR.

Accordingly, an organization may want to ensure a high-quality, timely response to user questions as a way of publicly promoting and positively marketing a brand, a product, or the organization (e.g., a business) generally. Moreover, timely and high-quality responses to a user's service requests via social media may convert detractors into promoters, neutralize potentially hostile or negative situations, and avoid escalation of a problem into a negative swarm of social media comments which may lead to a public relations problem.

In some implementations, the RQI is based on four factors: an empathy factor, a conversational factor, a timely acknowledgement factor, and a timely resolution factor. Implementations also support the use of more, fewer, or different factors to determine the RQI. The various communications, e.g., service requests and responses, in a service session may be analyzed to evaluate each of the four factors for the session. In some examples, the four factors are determined independently of one another. The four factors may be combined to generate the RQI for the service session. In some implementations, the RQI is a weighted sum or weighted average of the four factors. The four factors may be differently weighted or weighted the same in the combination. Implementations also support the use of other statistical combinations of the four factors to generate the RQI. By employing an RQI that includes empathy and conversational factors, as well as timely acknowledgement and timely resolution factors, implementations ensure that SRs are appropriately balancing the need for timely responses with humane and human-sounding responses to users' concerns.

The empathy factor may measure the degree to which the SR demonstrates care, concern, and respect for the user during the service session. In some examples, this may include determining whether the SR uses tone or vocabulary that is appropriate for the situation presented by the user, or whether the SR appropriately acknowledges the user's situation. For example, if a user is cheerful and joking, it may be appropriate for the SR to respond in a cheerful manner to substantially mirror the emotional tone set by the user. However, it may be inappropriate for the SR to employ a cheerful, joking manner if the user has experienced a traumatic or tragic event, such as a car accident or the death of a loved one. In such examples, a somber, supportive, and sympathetic tone may be appropriate. Moreover, the empathy factor in such examples may depend on whether the SR acknowledges the trauma or tragedy experienced by the user (e.g., "I'm sorry for your loss"). As another example, if the user is angry and combative, it may be appropriate for the SR to respond in a tone that is calm and attempts to deescalate the interaction. In such examples, it would be inappropriate for the SR to at least partly mirror the user's tone. In general, the empathy factor may depend on whether the SR is respectful to the user.

In some implementations, the communications between the user and the SR may be analyzed using natural language processing (NLP) or other techniques. Such processing may be used to generate feedback information to dynamically improve the response(s) of the SR, as described herein. Moreover, the analysis may detect and recognize user communications that may be considered sarcastic. Sometimes social media posts that are sarcastic in nature, if taken at purely face value, may be responded to inappropriately by a SR. Implementations may help avoid such inappropriate responses. Organizational communication guidelines may indicate that the SR is to avoid sounding sarcastic in any response to a user. In some instances, a post made by the user may have been sarcastic and implementations may assist the SR to recognize the sarcasm and avoid mirroring that particular tone.

In some examples, the empathy factor depends on whether the SR acknowledges particular details regarding characteristics of the user. For example, if the user has served in the military, or has family members who have served, the empathy factor may depend on whether the SR acknowledges and thanks the user for their military service or that of their family members. In some examples, the characteristics of the user may be expressed by the user during the service session. In some examples, the user characteristics may be included in a user profile which is visible to the SR during the session. In some implementations, the user profile may indicate particular words or phrases that have previously been useful to assist a particular user or defuse a tense situation (e.g., expressing support, apologizing, etc.). The use of such terms may be recommended to the SR during a session with the user, and the empathy factor may depend on whether the SR uses the recommended terms. Moreover, in some examples the member profile may indicate recent experiences of the user, such as denial of a loan. In such examples, the empathy factor may depend on whether the SR's tone and language are appropriate based on the past experiences of the user. The member profile may include information provided by the user as well as information collected based on previously interactions between the user and the business. The member profile may include information that is visible to the user, as well as information that is not visible to the user such as SR notes regarding the user.

The conversational factor may measure the extent to which the SR is using language that is natural and "human-sounding" instead of corporate jargon or language that seems machine-generated. The conversational factor may measure the extent to which the SR's language is consistent with social brand voice guidelines promulgated by the organization that employs the SR. In some examples, the conversational factor may measure the extent to which the SR is using language that corresponds to the particular grammar, style, or culture of the channel being used for the service session. For example, on a channel that supports the use of hashtags, the conversational factor may quantify the SR's use of appropriate and/or commonly understood hashtags. As another example, if the use of shortened words, acronyms, or emoji are appropriate for a particular channel, or appropriate based on the user's own use of such terms, then the conversational factor may depend on whether the SR uses such terms. The conversational factor may also depend on whether the SR is using repeated phrases, such as repeated, canned responses that seem robotic or machine-generated. For example, if the SR is using a repeated phrase in a service session, the conversational factor for the session may be set lower than if the SR is varying their language. In some implementations, the conversational factor may be further based on deepening considerations, such as whether the SR identified and followed up on tie-in opportunities based on the user-provided information. Such tie-in opportunities may include the opportunity to address other problems that the user may be having even if the user did not initially bring them up, discuss other possibilities for products or services related to the information provided by the user, and so forth.

The timely acknowledgement factor may measure whether the initial acknowledgement time is less than or equal to a predetermined threshold. The acknowledgement time may be the amount of time that passes from the service request (e.g., the user initially expressing the question, problem, or issue) until a SR first acknowledges the service request in a response to the user. For example, a service level objective (SLO) of the organization may indicate a goal of acknowledging a service request within a particular time period (e.g., one hour) of receiving the request, even if the particular question or problem may not be resolved within that time. The timely acknowledgement factor may be determined automatically by comparing the times when the service request was initially received and when the service request was first acknowledged by the SR.

The timely resolution factor may measure whether the user's issue was resolved within a time period that is less than or equal to a predetermined threshold. For example, a SLO of the organization may indicate a goal of resolving the user's service request (e.g., problem, complaint, or issue) within 24 hours of initially receiving the service request. The timely resolution factor may be determined automatically by comparing the times when the service request was initially received and when the service request was resolved. Such a determination may be based on accurate and detailed correspondence notes maintained in the user's member profile. Resolution may include resolution to the user's satisfaction, or resolution to the extent that the issue may be resolved even if it is not possible to fully satisfy the user. In some examples, a SLO may indicate that resolution occurs when the user indicates, publicly or privately to the SR, that the issue has been resolved. Resolution may be indicated by the user publicly or privately thanking the SR or the organization, or otherwise acknowledging gratitude or resolution generally.

Each of the factors may be assigned a value based on an analysis of the communications exchanged between a user and SR(s) during a service session. The value of factor(s) may also be based on other determinations, such as measured time durations for the time resolution and/or timely acknowledgement factors. In some implementations, one or more of the values for the factors may be assigned automatically using natural language (NL) analysis, semantic analysis, pattern matching, machine learning, or other types of analysis of the text of the communications. In some implementations, one or more of the values may be assigned manually by a reviewer, supervisor, or other personnel. In some implementations, the factor(s) may have a value that is a binary value (e.g., 0 or 1) indicating whether the standard for empathy, conversational tone, timely acknowledgement, or timely resolution was met by the SR. In some implementations, the value is determined from multiple possible values indicated numerically or descriptively (e.g., low, medium, or high). In some implementations, the value is determined from possible values along a spectrum (e.g., from 0 to 1). In examples where one or more factors are determined based on manual analysis of the communications, use of a binary value for the factors may enable faster determination of the factor(s) by a manual reviewer.

In some implementations, the empathy factor and/or the conversational factor are evaluated manually by a user analyzing the communications in the service sessions. In some implementations, one or both of the empathy factor or the conversational factor are evaluated automatically by a computing device that employs a natural language (NL) analysis, semantic analysis, pattern matching, or other types of algorithms. For example, the text (e.g., words, phrases, sentences, etc.) of the communications in a service session may be analyzed to determine an emotional characteristic (e.g., tone or sentiment) of the communication(s) sent by the user and/or the SR. If emotional tone matching is appropriate for the session, the empathy factor may be scored high if the emotional characteristics match. If emotional tone matching is not appropriate for the session (e.g., if anger de-escalation is called for to calm or placate a user), the empathy factor may be scored low if the SR's emotional characteristic is not calm or conciliatory.

In some examples, an automated algorithm is applied to determine whether the SR is using corporate jargon, through a (e.g., pattern-matching) comparison of the SR's words to a predetermined dictionary or list of words or phrases of corporate jargon, and the conversational factor may be determined based on the comparison. The automated algorithm may compare terms in the SR's communications with a previously generated dictionary of terms to use, or terms to avoid using, and determine one or both of the empathy factor or the conversational factor based on the comparison. NL analysis may also take into account geographical or cultural differences in the language used by members from different regions, or on different communication channels, and determine factor(s) based on the degree of correspondence between the language used by the member and the SR.

In some implementations, the analysis of communications in a service session may begin (e.g., prior to the initial communication of the SR) with an initial post by a user. The initial communication(s) of the user may be analyzed to identify a tone (e.g., earnest, sarcastic, etc.). The SR's response(s) to the initial communication(s) may then be analyzed to determine the tone of the SR's response(s). Implementations may then determine whether the tone of the SR matches that of the user, or if the tone is other than that of the user. For example, tone matching may be appropriate if the user is initially serious, earnest, and so forth, but tone matching may be inappropriate if the user is sarcastic. Sentiment analysis is one area where traditional social listening and response tools are inadequate, given that such tools may not correctly determine the tone of a post. In some implementations, the user's original post(s) may be analyzed and a notification may be sent to the SR indicating whether the tone is positive, negative, neutral, a question, sarcastic, off-topic, and/or other tone(s). Such a notification may provide initial guidance to help the SR compose an appropriate response.

In some implementations, tone-matching may be a fifth factor in determining RQIs. For example, a tone-matching factor may be set high if the SR's tone is appropriate with respect to the user's tone, and may be set low if the SR's tone is inappropriate with respect to the user's tone. In some implementations, tone-matching may be part of the conversational factor instead of a separate factor.

In some implementations, machine learning may be employed to determine one or both of the empathy factor or the conversational factor. For example, a classifier may be trained to determine the empathy factor or conversational factor based on input data from a service session. The classifier may be trained using stored training data from previous service sessions, where such training data has been (e.g., manually) tagged with an empathy factor or conversational factor. Implementations support the use of any supervised or unsupervised machine learning techniques to determine one or both of the empathy factor or the conversational factor.

In examples where the service session is conducted via telephone or other audio exchange, the system may use a speech-to-text (STT) algorithm to transcribe the audio communications and generate text output. The system may then analyze the text automatically, or present the text for manual analysis, as described above.

The multiple factors may be statistically combined to generate the RQI for the service session. In some implementations, the RQI may be evaluated dynamically, in real time, during a service session between a user and service representative (SR). If it is determined that the RQI, or at least one of the factors, is below a predetermined threshold value, one or more actions may be automatically performed. Such action(s) may include but are not limited to the following:

Presenting feedback information including a visual indication (e.g., text, symbols, colors, images, etc.) on a display of a computing device being used by the SR, the visual indication to indicate that the RQI is low, or that one or more of the factors are low (e.g., below threshold). Such a visual indication may be visible by the SR but not visible to the user being helped within the service session or to other users.

Presenting feedback information including an audio indication (e.g., tone(s), music, etc.) via an audio output device of a computing device being used by the SR, the audio indication to indicate that the RQI is low, or that one or more of the factors are low. Such an audio indication may be audible by the SR but not audible to the user being helped or to other users.

Presenting feedback information indicating that a supervisor or other SR is to join the service session. This may include notifying a supervisor or other SR to prompt the other individual to join the session and/or replace the current SR.

Presenting other feedback information to the SR, such as helpful advice, via text or audio output presented via the SR's computing device, to guide the SR's communications.

In some implementations, the system may analyze an SR's response to a user in real time as the SR is typing the response. The system may dynamically measure one or both of the empathy factor or the conversational factor using NL processing, semantic analysis, pattern matching with a dictionary, or other automated methods. If the factor(s) are dynamically determined to be lower than a threshold level, the SR may be presented with feedback information such as a warning, auto-correct suggestions, or other indications that the SR's response(s) may not meet predetermined standards for empathy or conversational tone. The dynamically determined factor(s) may also be stored for later analysis (e.g., after completion of the service session).

In some implementations, communications from one or more service sessions may be stored and analyzed later to determine the various factors and the RQI. SRs who exhibit a lower than threshold RQI, or lower than threshold for one or more of the factors, may be identified to receive feedback information in the form of further training or coaching to ensure that their future service meets social brand guidelines for empathy and conversational tone. SRs who consistently meet or exceed thresholds for RQI or individual factors may also be provided feedback information such as praise, promotion, bonuses, salary adjustments, or other rewards.

The RQIs and/or individual factor(s) may be calculated for multiple sessions and aggregated to determine trends such as improvements or degradations in service, for individual SRs or for a group of SRs (e.g., a customer service team). The aggregate analysis may determine whether business goals for service are being met or whether service is falling short of goals. Service sessions may be analyzed to identify aggregate metrics or trends during a particular time period (e.g., in the last day, or last week). In some examples, a sample (e.g., random sample) of sessions may be selected to be analyzed. Trends or patterns for aggregate or individual SR metrics may be determined for any time period, such as during a particular day, across days of a week, across month(s) or year(s), and so forth. Identified trends or patterns may be used for various purposes. For examples, if a particular SR shows lower RQI or factor(s) on particular days or during a particular time of day, a manager may explore the possibility of changing the SR's schedule so that the SR works at their higher-performing times. Trends or patterns in an individual SR(s)' RQI or factor(s) may also be used to identify particular SR(s) for feedback. Such feedback may include positive feedback to reinforce and/or reward good performance. Feedback may also include or coaching.

In some implementations, the communications of the user are analyzed in addition to the communications of the SR. For example, a NL or other type of analysis may be performed on the user's text input to determine the user's emotional state, such as whether the user is angry and/or combative. As another example, a voice analysis may be performed on recorded speech of the user to determine the user's emotional state. In such examples, the system may automatically send encouragement or suggestions to the SR to help the SR defuse the situation. The system may also automatically send notifications to a manager or other SR(s) indicating that the assisting SR may themselves need assistance. After the service session is complete, the SR may be rewarded with praise, a monetary bonus, a break, a reward, or some other positive feedback in return for successful handling of a difficult user.

The system may also be employed to monitor the state of the SR over time. For example, the communications of the SR may be monitored and analyzed to determine a mood of the SR (e.g., angry, tired, frustrated) and the SR's break schedule may be altered to give the SR a break in response to a determined current mood or detected change in mood. The mood of the SR may also prompt the system to present soothing and/or humorous images, music, video, and/or other content to the SR, as an attempt to positively alter the mood of the SR. Communications of a SR may also be monitored over time to identify situations in which the SR is under an excessive amount of stress and may need medical attention.

In general, the system enables a more rapid and dynamic response to the measured RQI, or to the measured individual factor(s), than traditional systems. For example, based on a dynamic determination that a particular SR's RQI, empathy factor, or conversational factor has dropped below a threshold during a service session, the system may automatically respond with any of the actions described above. Accordingly, implementations provide a fundamental improvement in the operation of computing devices that provide functionality for customer service or other types of service, by dynamically responding to measured, real time changes in service quality.

In some implementations, the system may compare, synchronize, and/or correlate the RQI score with results from a user feedback survey that that may be automatically sent to users recently serviced through a social channel. The survey may solicit the users' feedback regarding their service, and may ask the users' to provide information regarding the empathy factor, conversational factor, timely acknowledgement factor, timely resolution factor, and/or other factors. In some implementations, the user may have access to a history of their support requests (e.g., reported issues, questions, etc.), the SR response(s), and the resolution(s) to the request(s). The history may, in some examples, present a record of one or more service sessions including the communications exchanged during the session(s). Such a history may be presented on a web page or some other application.

As used herein, the term "real time" refers to a process that is performed without intentional delay given: the processing limitations of a system; the time required to accurately obtain, communicate, and/or store data; the rate of change of the data; and/or other considerations. In some examples, "real time" is used to describe operation(s) that are performed concurrently with respect to other operation(s), or operations(s) that are performed in a same software execution path as other operation(s). For example, the communications exchanged between a user and a SR during a service session may be collected during the service session, without intentional delay between a time when a communication becomes available (e.g., is published) and when the communication is retrieved. Moreover, the analysis of the communications to generate RQI(s) and feedback information may be performed in real time with respect to the posting of the communications, such that there is no intentional delay between the posting of the communications and the analysis. In some examples, the retrieval of the communications and their analysis may be performed within a same execution path, such that the communications are retrieved by a same process that performs the analysis, or such that the retrieval of the communications triggers the analysis by the same process or a different process without intentional delay.

FIG. 1 depicts an example system for determining and using RQI(s) 124 to measure the quality of SR communications in a service session 114, according to implementations of the present disclosure. As shown in the example of FIG. 1, a user 102 may employ a user device 104 to interact, in a service session 114, with a SR 108 employing a SR device 110. During the service session 114, the user 102 and the SR 108 may exchange any number of communications, such as user communication(s) 116 (e.g., from the user to the SR) and SR communication(s) 118 (e.g., from the SR to the user). In some examples, the service session 114 may be initiated by the user 102 submitting a service request. For example, the user 102 may ask a question, lodge a complaint, request information, or otherwise submit any type of query. In some examples, the user 102 is a customer of a business represented by the SR 108, and the user 102 may ask questions regarding the services and/or products provided by the business. In some examples, the service session 114 is initiated when the SR 108 first responds to and/or acknowledges the user's initial service request.

In some examples, the service session 114 may be conducted via social media. For example, the user 102 may initiate the service session 114 by posting a question to the organization's page on a social network site. As another example, the user 102 may initiate the service session 114 by publishing (e.g., tweeting) information that includes some indication (e.g., a hashtag or recipient identifier) of the organization that is the target and/or subject of the published information. As used herein, a social media channel or a social network may include any environment in which users are able to publish content (e.g., posts) and respond to published content. Responses to published content may include additional content, such as comments. Responses may also include sharing, retweeting, or otherwise republishing a post, liking a post, disliking a post, rating a post, or otherwise indicating an opinion regarding the post. Some examples of social media channels are Facebook™, Twitter™, Instagram™, WeChat™, and so forth. In some examples, the service session 114 may be conducted via a social media channel such that any number of other users of the social media are able to view and/or respond to the communication(s) between the user 102 and the SR 108.

Implementations also support the use of other communication channels for conducting the service session 114. For example, the service session 114 may include any number of communications between the user 102 and the SR 108 via email, text messages, online interactive chat, or other forms of communication that may not be public. In some examples, the service session 114 may be a telephone conversation and/or audio/video chat session between the user 102 and the SR 108, such that the communication(s) include audio communication(s).

In some implementations, the user device 104 may execute a user application 106 and the SR device 110 may execute a SR application 112. The user application 106 and SR application 112 may facilitate the communications between the user 102 and the SR 108 in the service session 114. For example, the user application 106 and/or the SR application 112 may be a social network client application that enables the user 102 and/or SR 108 to publish, view publications, respond to publications, or otherwise interact with users in a social network. As another example, the user application 106 and/or the SR application 112 may be an email client or text message client that enables the reading and sending of emails and/or text messages. The user application 106 and/or the SR application 112 may be a chat client that enables an interactive text chat, audio chat, and/or video chat session between parties. The user application 106 and/or the SR application 112 may be a voice telephony application that enables voice and/or video conversation. The user application 106 and/or the SR application 112 may be a native application, a mobile application, a web application, and/or any other type of software. The user device 104 and the SR device 110 may be any type of computing device.

The system may also include one or more analysis device(s) 120. The analysis device(s) 120 may include any type of computing device, and may execute software modules such as the analysis module(s) 122 and the feedback module(s) 126. The analysis module(s) 122 may receive or otherwise access the user communication(s) 116 and/or SR communication(s) 118 communicated during the service session 114. In some implementations, the analysis module(s) 122 may monitor the communications during a service session 114. The analysis module(s) 122 may analyze one or more of the SR communication(s) 118 and/or user communication(s) 116 and determine one or more RQIs 124 corresponding to the service session 114. In examples where the user communication(s) 116 and/or SR communication(s) 118 include voice communications or other audio data, the analysis module(s) 1222 may perform speech-to-text (STT) conversion of the communication(s) to generate text data (e.g., at least a partial transcript) prior to further analysis. The RQI(s) 124 may be stored on the analysis device(s) 120 or elsewhere, and may be accessed by the feedback module(s) 126. Based on the RQI(s) 124, the feedback module(s) 126 may determine whether to send feedback information 128 to the SR 108. The feedback module(s) 126 may also determine, based on the RQI(s) 124, the particular feedback information 128 to be sent. The feedback information 128 may be communicated to the SR device 110 for presentation in a user interface (UI) of the SR application 112.

The various devices and software modules shown in FIG. 1 may communicate over one or more networks (not shown). The network(s) may include wired and/or wireless network(s) of any type, supporting communications using any communication protocol or format. Although FIG. 1 depicts a particular example in which the user device 104, SR device 110, and analysis device(s) 120 execute various software modules to perform different functionality, this example is not limiting of implementations. For example, in some implementations the operations performed by the analysis module(s) 122 and/or feedback module(s) 126 may be performed by software module(s) executing on the SR device 110 or elsewhere. Moreover, although the analysis module(s) 122 and feedback module(s) 126 are depicted in FIG. 1 as separate modules, in some implementations the operations performed by the analysis module(s) 122 and feedback module(s) 126 may be performed by a same set of one or more software modules.

Figure 2:
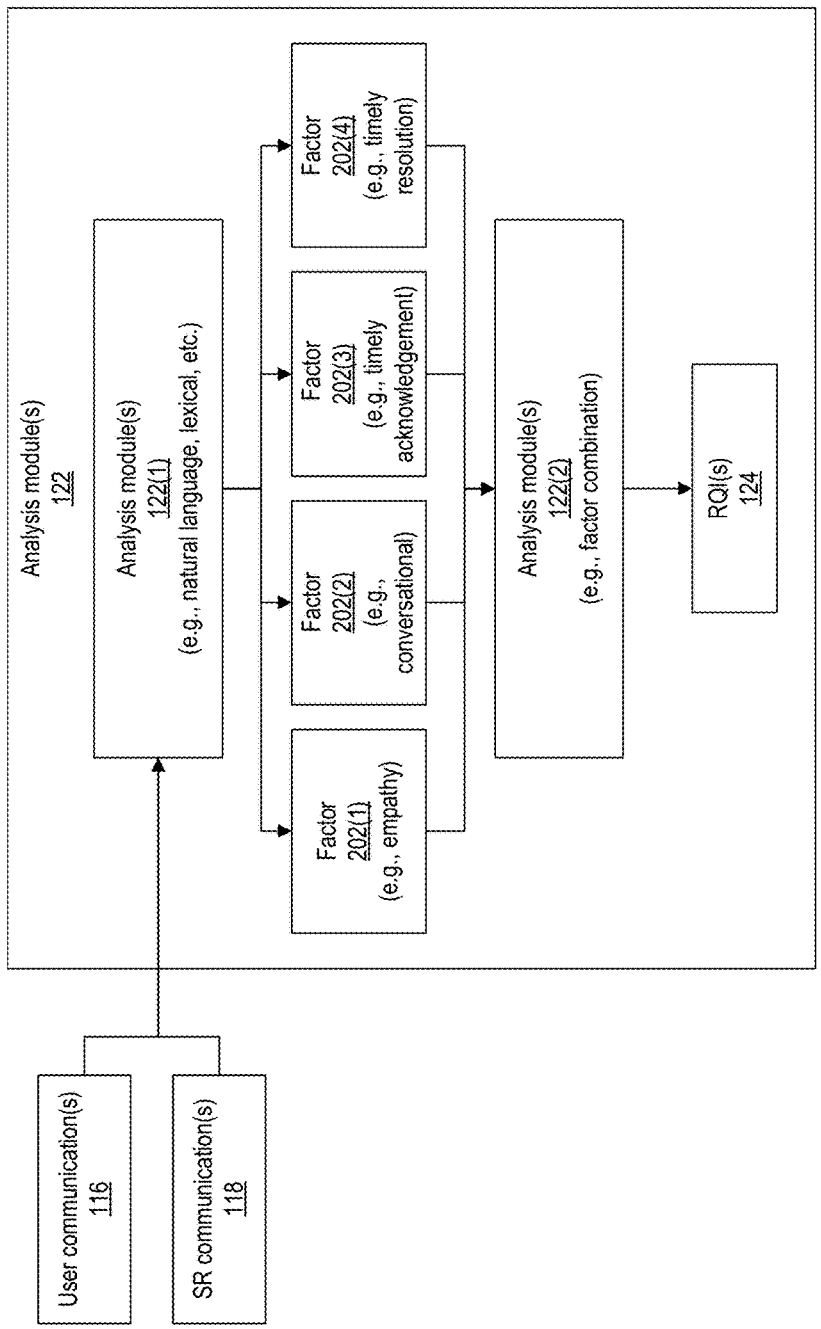
FIG. 2 depicts an example system for determining a response quality index based on multiple factors, according to implementations of the present disclosure.

FIG. 2 depicts an example system for determining RQI(s) 124 based on multiple factors 202, according to implementations of the present disclosure. As described above, one or both of the user communication(s) 116 or the SR communication(s) 118 may be accessed and analyzed by analysis module(s) 122(1) included in the analysis module(s) 122. The analysis module(s) 122(1) may perform various types of analysis to determine any number of factors 202. The analysis to determine the factor(s) 202 is described further with reference to FIGS. 5-8. As described above, the analysis module(s) 122(1) may analyze the communication(s) and/or other information to determine an empathy factor 202(1), a conversational factor 202(2), a timely acknowledgement factor 202(3), a timely resolution factor 202(4), and/or other factor(s) 202. The factor(s) 202 may be accessed by analysis module(s) 122(2) and used to generate one or more RQIs 124.

In some implementations, the factor(s) 202 may be (e.g., mathematically) combined to generate the RQI(s) 124. For example, the RQI 124 may be a sum or average of multiple factors 202. In some implementations, the RQI 124 may be a weighted average of multiple factors 202, in which each factor 202 is assigned a weight. The weights of the factors 202 may be the same weight, or different weights, and may be adjustable to more heavily weight certain factor(s) 202 relative to other factor(s) 202 in the RQI 124. Formula 1 below gives an example of a calculation of the RQI 124 based on factors 202.

$$RQI = \frac{\sum_{i=1}^{n} w_i F_i}{A} \qquad \text{Formula 1}$$

In Formula 1, n is the number of factors 202 (e.g., four), $F_i$ is the ith factor, $w_i$ is the weight of the ith factor, and A is a normalization coefficient. The normalization coefficient may be employed to normalize the RQI 124 to have values within a particular range (e.g., from 0 to 1, from 0 to 100, etc.). In some implementations, the normalization coefficient may be omitted or set to 1. In some implementations, each of four factors 202 may be a binary value (e.g., 0 or 1), such that the RQI 124 may be within a range from 0 to 4.

In some implementations, the communication(s) in a service session 114 may be stored in memory and analyzed after the service session 114 has completed. In such implementations, the factor(s) 202 and the RQI(s) 124 may be calculated after the service session 114, and used to determine what feedback information 128, if any, is to be sent to the SR 108. In some implementations, one or more of the factors 202 may be calculated one or more times during the service session 114 based on a real-time analysis of the communications in the service session 114. The factor(s) 202 may be stored and accessed following the service session 114 to calculate the RQI(s) 124. In some examples, the RQI(s) 124 may also be calculated (e.g., in real time) while the service session 114 is in progress. In some instances, particular factor(s) 202 such as the timely resolution factor may not be calculated until after the service session 114 has completed (e.g., after the service request has been resolved).

Figure 3:
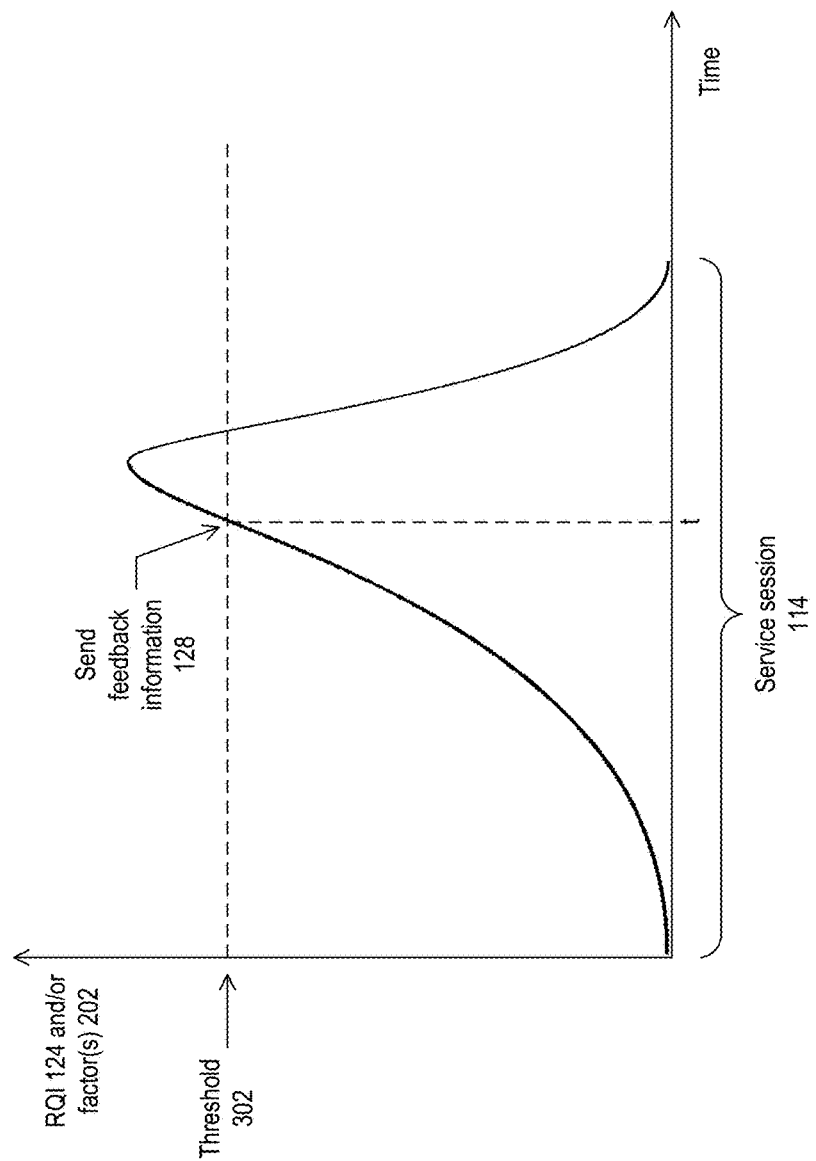
FIG. 3 is a schematic depicting an example of the variation over time of a response quality index and/or individual factor(s) that contribute to the response quality index, according to implementations of the present disclosure.

FIG. 3 is a schematic depicting an example of the variation over time of a RQI 124 and/or individual factor(s) 202 that contribute to the RQI 124, according to implementations of the present disclosure. In the example of FIG. 3, one or more of the factors 202 or the RQI 124 are calculated in real time at multiple times during the service session 114, and arranged in a graph showing the variation over time of the value of the RQI 124 and/or factor(s) 202. The tracked value (e.g., the RQI 124 and/or factor(s) 202) begins at a minimum or baseline value at the beginning of a service session 114. At a particular time t, the tracked value reaches or exceeds a predetermined threshold value 302. At that time, feedback information 128 may be generated and communicated to the SR device 110 to be presented to the SR 108 via the SR application 112. In the example of FIG. 3, the tracked value begins decreasing at some time following the sending of the feedback information 128 to the SR 108. The generation and sending of feedback information 128 may be triggered by the RQI 124 meeting or exceeding a threshold 302. In some implementations, the generation and sending of feedback information 128 may be triggered by one or more factors 202 meeting or exceeding a threshold 302. For example, the feedback information 128 may be sent in response to a determination that the empathy factor and/or the conversational factor have met or exceeded a threshold 302, based on the automated periodic calculation of such factor(s) 202 at predetermined intervals (e.g., every 10 seconds) during the service session 114. The tracked value may be calculated at any interval, or with any periodicity, during the service session 114. In some implementations, the tracked value may be re-calculated in response to each new communication sent by the SR 108 and/or user 102.

In some implementations, a time variation graph such as that of FIG. 3, or some other visual description of the RQI 124 and/or factor(s) 202, may be presented to a supervisor or other individual to enable their monitoring of the various service sessions 114 of one or more SRs 108 during and/or after the service sessions 114.

Figure 4:
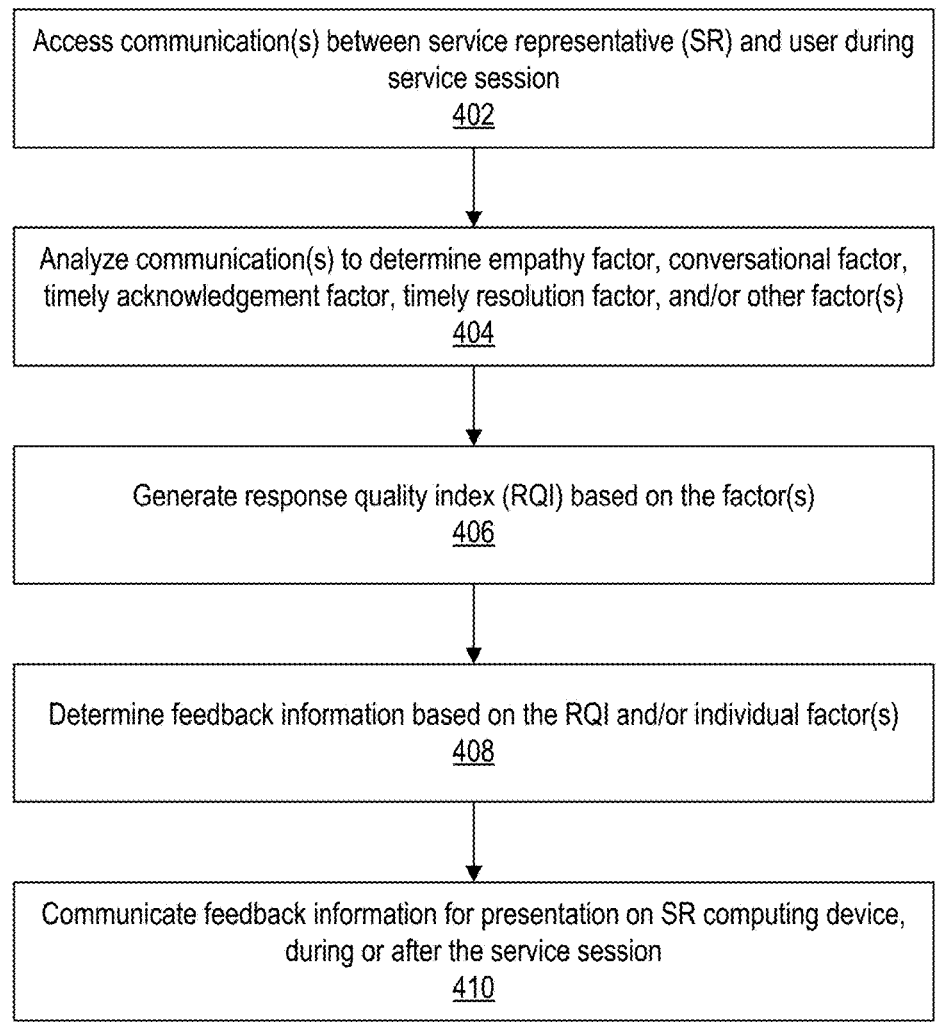
FIG. 4 depicts a flow diagram of an example process for determining and using a response quality index, according to implementations of the present disclosure.

FIG. 4 depicts a flow diagram of an example process for determining and using a RQI 124, according to implementations of the present disclosure. The operations of the process may be performed by one or more of the user application 106, the SR application 112, the analysis module(s) 122, the feedback module(s) 126, or other software module(s) executing on the user device 104, the SR device 110, the analysis device(s) 120, or elsewhere.

The SR communication(s) 118 and/or user communication(s) 116 may be accessed (402). The communication(s) may be accessed during the service session 114 for real time analysis, or retrieved from storage after the service session 114 has completed to review, audit, or otherwise analyze the completed session.

The communication(s) may be analyzed (404) to determine the various factors 202, such as the empathy factor, the conversational factor, the timely acknowledgement factor, the timely resolution factor, or other factor(s) 202. The analysis to determine the factor(s) 202 may be performed while the service session 114 is ongoing (e.g., in real time) and/or after the service session 114 has completed.

Based on the factor(s) 202, one or more RQIs 124 may be generated (406). The RQI(s) 124 may be generated while the service session 114 is ongoing (e.g., in real time) and/or after the service session 114 has completed.

Feedback information 128 may be determined (408) based on the RQI(s) 124 and/or individual factor(s) 202 as described above.

The feedback information 128, if any, may be communicated (410) to the SR device 110 to presentation to the SR 108 via a UI of the SR application 112.

Figure 5:
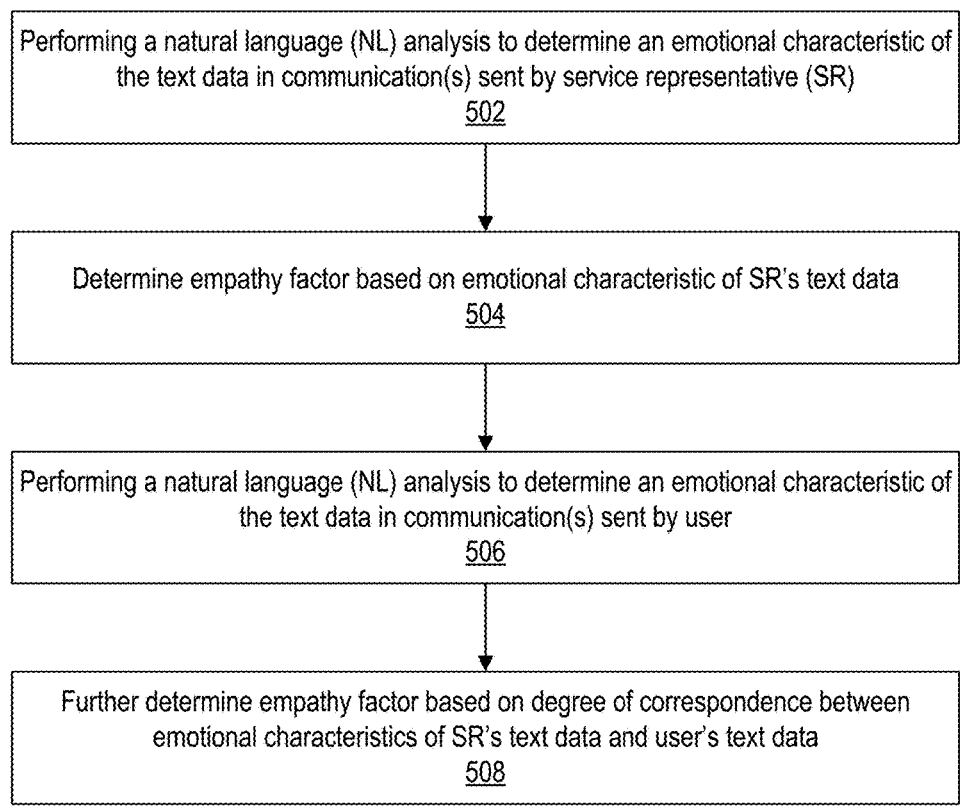
FIG. 5 depicts a flow diagram of an example process for determining an empathy factor for the response quality index, according to implementations of the present disclosure.

FIG. 5 depicts a flow diagram of an example process for determining an empathy factor for the RQI 124, according to implementations of the present disclosure. The operations of the process may be performed by one or more of the user application 106, the SR application 112, the analysis module(s) 122, the feedback module(s) 126, or other software module(s) executing on the user device 104, the SR device 110, the analysis device(s) 120, or elsewhere.

The text data of the SR communication(s) 118 may be accessed and analyzed to determine an emotional characteristic of the SR's text data. In some implementations, a NL analysis may be performed (502) to determine the emotional characteristic, such as whether the text data indicates that the SR 108 is calm, agitated, angry, friendly, and so forth.

The empathy factor may be determined (504) based on the emotional characteristic. For example, if the emotional characteristic indicates anger or frustration, the empathy factor may be evaluated lower than if the emotional characteristic indicates calm or cheerfulness.

In some implementations, the text data of the user communication(s) 116 may also be accessed and analyzed to determine an emotional characteristic of the user's text data. In some implementations, a NL analysis may be performed (506) to determine the user's emotional characteristic, such as whether the text data indicates that the user 102 is calm, agitated, angry, friendly, and so forth.

In some implementations, the empathy factor may be determined (508) based on a degree of correspondence between the emotional characteristics of the SR's text data and the user's text data. For example, in circumstances where the user 102 is calm or friendly it may be appropriate for the SR 108 to also be calm or friendly, thus mirroring the user's emotional state. The empathy factor may be evaluated higher, in such circumstances, if the SR 108 mirrors the user's emotional state. In other situations, such as where the user 102 is angry, agitated, sad, or belligerent, it may be appropriate for the SR 108 to not mirror the user's emotional state and instead be calm, consoling, conciliatory, and so forth. In such circumstances, the empathy factor may be evaluated higher if the SR 108 does not mirror the user's emotional state.

Figure 6:
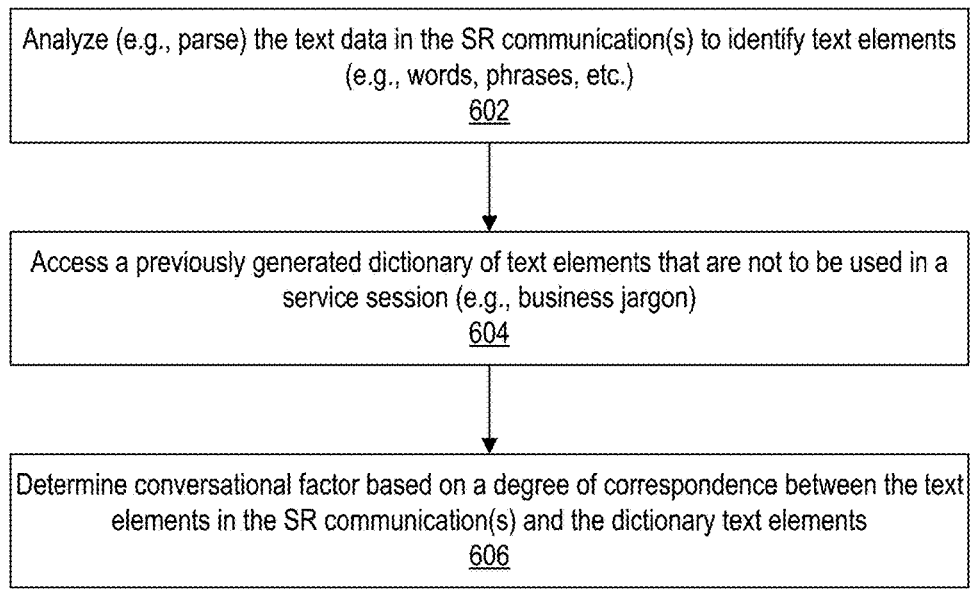
FIG. 6 depicts a flow diagram of an example process for determining a conversational factor for the response quality index, according to implementations of the present disclosure.

FIG. 6 depicts a flow diagram of an example process for determining a conversational factor for the RQI 124, according to implementations of the present disclosure. The operations of the process may be performed by one or more of the user application 106, the SR application 112, the analysis module(s) 122, the feedback module(s) 126, or other software module(s) executing on the user device 104, the SR device 110, the analysis device(s) 120, or elsewhere.

In some implementations, the text data in the SR communication(s) 118 may be parsed or otherwise analyzed (602) to identify one or more particular words, phrases, or other text elements present in the text data. A previously generated dictionary may be accessed (604). The dictionary may list any number of text elements that are to be avoided by the SR 108 in a service session 114, such as business or corporate jargon, words or phrases that sound machine-generated or robotic, and so forth. The conversational factor may be determined (606) based on a degree of correspondence between the text elements in the SR communication(s) 118 and the text elements present in the dictionary. For example, if the SR 108 uses business jargon in their communication(s), the conversational factor may be set lower than it would be if they avoid business jargon. In some implementations, the dictionary may include text elements that the SR 108 is encouraged to use in a service session 114, and the conversational factor may be set higher if the SR 108 uses such terms. Accordingly, the dictionary may include a list of terms to avoid and/or a list of terms to use, and the conversational factor may be determined based on whether the SR 108 tends to use or avoid such terms as appropriate.

Figure 7:
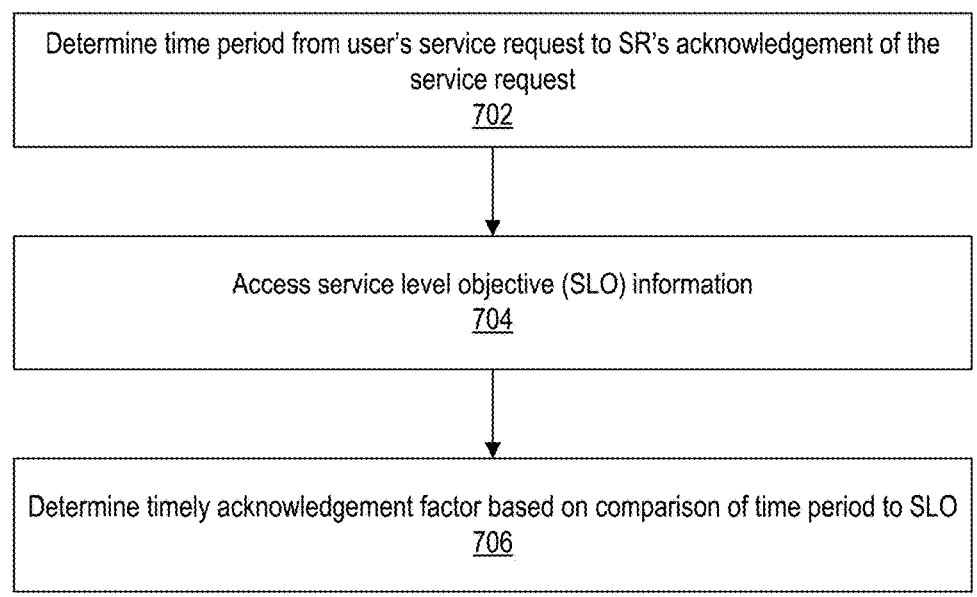
FIG. 7 depicts a flow diagram of an example process for determining a timely acknowledgement factor for the response quality index, according to implementations of the present disclosure.

FIG. 7 depicts a flow diagram of an example process for determining a timely acknowledgement factor for the RQI 124, according to implementations of the present disclosure. The operations of the process may be performed by one or more of the user application 106, the SR application 112, the analysis module(s) 122, the feedback module(s) 126, or other software module(s) executing on the user device 104, the SR device 110, the analysis device(s) 120, or elsewhere.

A time period may be determined (702) from the user's initial service request until the SR's first acknowledgement of the service request. SLO information may be accessed (704). The SLO information may indicate a maximum time period, or a preferred time period, within which the user's service request is to be acknowledged by a SR 108. The timely acknowledgement factor may be determined (706) based on a comparison of the measured time period and the SLO. For example, if the time period is higher than the SLO, the timely acknowledgement factor may be set lower than it would be if the time period is less than or equal to the SLO.

Figure 8:
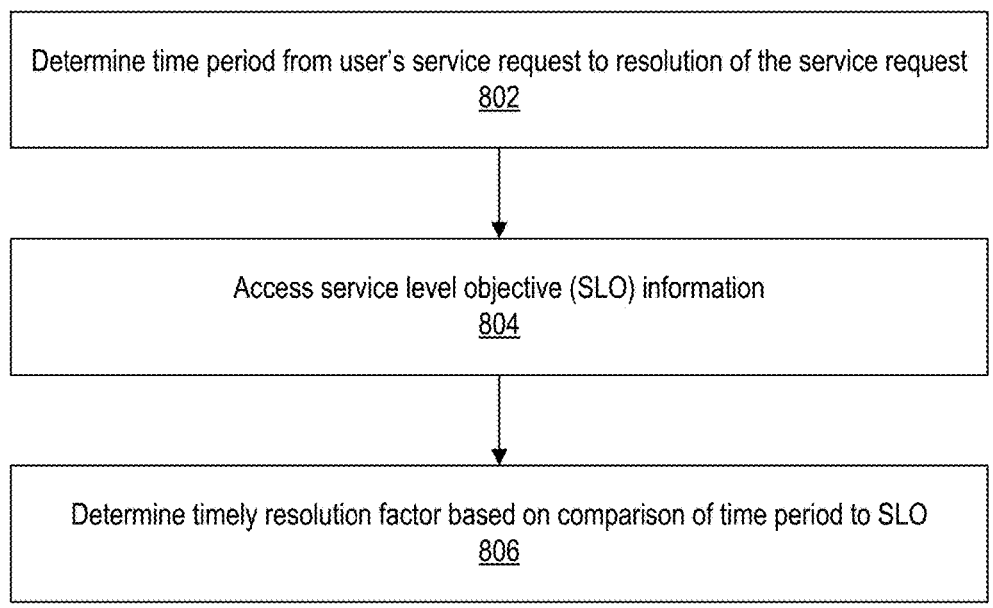
FIG. 8 depicts a flow diagram of an example process for determining a timely resolution factor for the response quality index, according to implementations of the present disclosure.

FIG. 8 depicts a flow diagram of an example process for determining a timely resolution factor for the RQI 124, according to implementations of the present disclosure. The operations of the process may be performed by one or more of the user application 106, the SR application 112, the analysis module(s) 122, the feedback module(s) 126, or other software module(s) executing on the user device 104, the SR device 110, the analysis device(s) 120, or elsewhere.

A time period may be determined (802) from the user's initial service request until the resolution of the service request. SLO information may be accessed (804). The SLO information may indicate a maximum time period, or a preferred time period, within which the user's service request is to be resolved. The timely resolution factor may be determined (806) based on a comparison of the measured time period and the SLO. For example, if the time period is higher than the SLO, the timely resolution factor may be set lower than it would be if the time period is less than or equal to the SLO.

Figure 9:
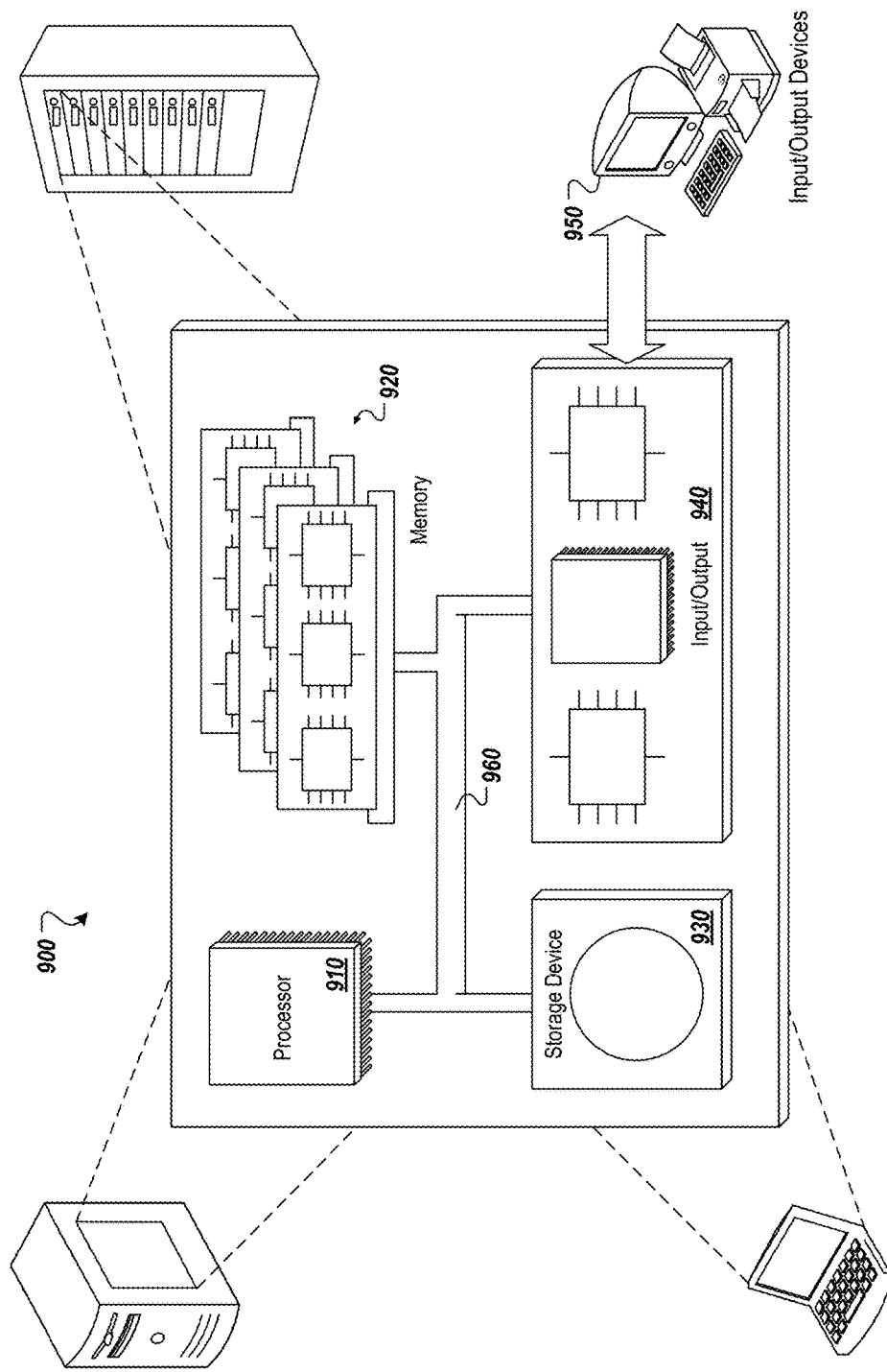
FIG. 9 depicts an example computing system, according to implementations of the present disclosure.

FIG. 9 depicts an example computing system, according to implementations of the present disclosure. The system 900 may be used for any of the operations described with respect to the various implementations discussed herein. For example, the system 900 may be included, at least in part, in one or more of the user device 104, the SR device 110, or the analysis device(s) 120 described herein. The system 900 may include one or more processors 910, a memory 920, one or more storage devices 930, and one or more input/output (I/O) devices 950 controllable via one or more I/O interfaces 940. The various components 910, 920, 930, 940, or 950 may be interconnected via at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any number of volatile memory units, any number of non-volatile memory units, or both volatile and non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces that enable communications between computing devices in the system 900, or between the system 900 and other network-connected computing systems. The network interface(s) may include one or more network interface controllers (NICs) or other types of transceiver devices configured to send and receive communications over one or more networks using any network protocol.

Computing devices of the system 900 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter affecting a machine-readable propagated signal, or a combination of one or more of these. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   accessing, by the at least one processor, at least one communication from a service representative (SR) to a user during a service session facilitated through a computer-implemented service;
   determining, by the at least one processor, at least one factor for the service session based at least partly on text data in the at least one communication, wherein the at least one factor includes a timely resolution factor, and wherein determining the timely resolution factor includes:
      determining a time period from the user's service request submission to a resolution of the service request; and
      determining the timely resolution factor based on a comparison of the time period to a service level objective (SLO);
   based on the at least one factor, generating, by the at least one processor, a response quality index (RQI) that indicates a quality of one or more responses provided by the SR in the service session;
   based on one or more of the RQI or the at least one factor, determining, by the at least one processor, feedback information; and
   presenting, by the at least one processor, the feedback information on a computing device associated with the SR, wherein the determining of the at least one factor and the presenting of the feedback information is performed in real time with respect to the sending of the at least one communication during the service session through the computer-implemented service.

2. The method of claim 1, wherein the at least one factor further includes one or more of:
 an empathy factor;
 a conversational factor; and
 a timely acknowledgement factor.

3. The method of claim 2, wherein determining the at least one factor includes:
 performing a natural language (NL) analysis to determine a SR emotional characteristic of the text data; and
 determining the empathy factor based on the emotional characteristic.

4. The method of claim 3, wherein determining the at least one factor further includes:
 determining a user emotional characteristic by performing the NL analysis to analyze user text data in at least one communication from the user during the service session; and
 determining the empathy factor based on a degree of correspondence between the user emotional characteristic and the SR emotional characteristic.

5. The method of claim 2, wherein determining the at least one factor includes:
 analyzing the text data to identify text elements of the text data; and
 determining the conversational factor based on a degree of correspondence between the text elements and a previously generated dictionary of terms.

6. The method of claim 2, wherein determining the timely acknowledgement factor includes: determining a time period from the user's service request submission to the SR's acknowledgement of the service request; and determining the timely acknowledgement factor based on a comparison of the time period to the service level objective (SLO).

7. The method of claim 1, wherein:
 determining the at least one factor is performed during the service session; and
 the feedback information is communicated for presentation during the service session.

8. The method of claim 1, wherein:
 the feedback information is further presented after the service session.

9. The method of claim 1, wherein communicating the feedback information includes causing another SR to be added to the service session.

10. The method of claim 1, wherein the RQI is a weighted mathematical combination of the at least one factor.

11. A system, comprising:
 at least one processor; and
 a memory communicatively coupled to the at least one processor, the memory storing instructions which, when executed by the at least one processor, cause the at least one processor to perform operations comprising:
  accessing at least one communication from a service representative (SR) to a user during a service session facilitated through a computer-implemented service;
  determining at least one factor for the service session based at least partly on text data in the at least one communication, wherein the at least one factor includes a timely resolution factor, and wherein determining the timely resolution factor includes:
   determining a time period from the user's service request submission to a resolution of the service request; and
   determining the timely resolution factor based on a comparison of the time period to a service level objective (SLO);
  based on the at least one factor, generating a response quality index (RQI) that indicates a quality of one or more responses provided by the SR in the service session;
  based on one or more of the RQI or the at least one factor, determining feedback information; and
  presenting the feedback information on a computing device associated with the SR, wherein the determining of the at least one factor and the presenting of the feedback information is performed in real time with respect to the sending of the at least one communication during the service session through the computer-implemented service.

12. The system of claim 11, wherein the at least one factor further includes one or more of:
 an empathy factor;
 a conversational factor; and
 a timely acknowledgement factor.

13. The system of claim 12, wherein determining the at least one factor includes:
 performing a natural language (NL) analysis to determine a SR emotional characteristic of the text data; and
 determining the empathy factor based on the emotional characteristic.

14. The system of claim 13, wherein determining the at least one factor further includes:
 determining a user emotional characteristic by performing the NL analysis to analyze user text data in at least one communication from the user during the service session; and
 determining the empathy factor based on a degree of correspondence between the user emotional characteristic and the SR emotional characteristic.

15. The system of claim 12, wherein determining the at least one factor includes:
 analyzing the text data to identify text elements of the text data; and
 determining the conversational factor based on a degree of correspondence between the text elements and a previously generated dictionary of terms.

16. One or more computer-readable media storing instructions which, when executed by at least one processor, cause the at least one processor to perform operations comprising:
 accessing at least one communication from a service representative (SR) to a user during a service session facilitated through a computer-implemented service;
 determining at least one factor for the service session based at least partly on text data in the at least one communication, wherein the at least one factor includes a timely resolution factor, and wherein determining the timely resolution factor includes:
  determining a time period from the user's service request submission to a resolution of the service request; and
  determining the timely resolution factor based on a comparison of the time period to a service level objective (SLO);
 based on the at least one factor, generating a response quality index (RQI) that indicates a quality of one or more responses provided by the SR in the service session;

based on one or more of the RQI or the at least one factor, determining feedback information; and presenting the feedback information on a computing device associated with the SR, wherein the determining of the at least one factor and the presenting of the feedback information is performed in real time with respect to the sending of the at least one communication during the service session through the computer-implemented service.

17. The one or more computer-readable media of claim 16, wherein the at least one factor further includes one or more of:

an empathy factor;
a conversational factor; and
a timely acknowledgement factor.

18. The one or more computer-readable media of claim 17, wherein determining the at least one factor includes:

performing a natural language (NL) analysis to determine a SR emotional characteristic of the text data; and
determining the empathy factor based on the emotional characteristic.

19. The one or more computer-readable media of claim 17, wherein determining the at least one factor includes:

analyzing the text data to identify text elements of the text data; and
determining the conversational factor based on a degree of correspondence between the text elements and a previously generated dictionary of terms.

* * * * *